(12) United States Patent
Nakagawa et al.

(10) Patent No.: US 9,229,272 B2
(45) Date of Patent: Jan. 5, 2016

(54) LIQUID CRYSTAL DISPLAY DEVICE

(71) Applicant: Japan Display Inc., Tokyo (JP)

(72) Inventors: Atsuo Nakagawa, Tokyo (JP); Eiji Oohira, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 14/056,988

(22) Filed: Oct. 18, 2013

(65) Prior Publication Data

US 2014/0111740 A1    Apr. 24, 2014

(30) Foreign Application Priority Data

Oct. 24, 2012  (JP) ................... 2012-234973

(51) Int. Cl.
*G02F 1/1335* (2006.01)
*G02F 1/1333* (2006.01)
*F21V 7/04* (2006.01)
*F21V 8/00* (2006.01)

(52) U.S. Cl.
CPC .......... *G02F 1/133615* (2013.01); *G02B 6/002* (2013.01); *G02B 6/0021* (2013.01); *G02F 1/133603* (2013.01); *G02F 2001/133612* (2013.01)

(58) Field of Classification Search
USPC .................................. 362/628, 608
See application file for complete search history.

(56) References Cited

U.S. PATENT DOCUMENTS 7,808,576 B2 * 10/2010 Takahashi et al. .............. 349/65
2004/0109306 A1 * 6/2004 Lee ................................. 362/31
2010/0053493 A1 3/2010 Kuwajima et al.

FOREIGN PATENT DOCUMENTS

JP       2010-62016      3/2010

* cited by examiner

*Primary Examiner* — Wen-Ying P Chen
(74) *Attorney, Agent, or Firm* — Lowe Hauptman & Ham, LLP

(57) ABSTRACT

A liquid crystal display device includes a liquid crystal display panel, and a backlight of an edge light system. The backlight includes a light source, and a light guide plate that has a light emitting surface for emitting a light input from the light source into a planar shape, and is placed on the liquid crystal display panel. The light source is located to face an end surface of the light guide plate on a side of the liquid crystal display panel so as not to overlap with the liquid crystal display panel.

7 Claims, 4 Drawing Sheets

LIQUID CRYSTAL DISPLAY DEVICE

CROSS-REFERENCE TO RELATED APPLICATION

The present application claims priority from Japanese application JP2012-234973 filed on Oct. 24, 2012, the content of which is hereby incorporated by reference into this application.

BACKGROUND OF THE INVENTION

1. Field of the Invention

The present invention relates to a liquid crystal display device.

2. Description of the Related Art

The liquid crystal display device enables a bright display by the aid of a backlight having a structure that converts a point light source into a surface light source by a light guide plate. In general, the light guide plate is placed on a liquid crystal display panel, and a light emitting component such as a light emitting diode used as the point light source is also placed on the liquid crystal display panel (refer to JP 2010-62016 A).

In recent years, it is demanded to thin the liquid crystal display device, but the liquid crystal display device is inhibited from being thinned because of a thickness of the light emitting component placed on the liquid crystal display panel.

SUMMARY OF THE INVENTION

The present invention aims at thinning a liquid crystal display device.

(1) According to the present invention, there is provided a liquid crystal display device including: a liquid crystal display panel; and a backlight of an edge light system, in which the backlight includes a light source, and a light guide plate that has a light emitting surface for emitting a light input from the light source into a planar shape, and is placed on the liquid crystal display panel, and the light source is located to face an end surface of the light guide plate on a side of the liquid crystal display panel so as not to overlap with the liquid crystal display panel. According to the present invention, since the light source and the liquid crystal display panel do not overlap with each other, the liquid crystal display device can be thinned.

(2) In the liquid crystal display device according to the item (1), the liquid crystal display panel has a pair of substrates, a flexible wiring substrate is connected to one of the substrates, and the light source is mounted on the flexible wiring substrate, and located on a side of an end surface of the one of the substrates which is connected with the flexible wiring substrate.

(3) In the liquid crystal display device according to the item (2), the flexible wiring substrate is connected to the one of the substrates on a first surface on which the light source is mounted, and has a signal line electrically connected to the liquid crystal display panel, and the signal line passes on the first surface in an area extending from the liquid crystal display panel to the light source, and passes on a second surface opposite to the first surface in an area where the light source is mounted.

(4) In the liquid crystal display device according to any one of the items (1) to (3), the light guide plate includes a facing portion that faces the liquid crystal display panel, and a protrusion portion that protrudes from a position facing the liquid crystal display panel, and the end surface facing the light source is formed in the protrusion portion.

(5) In the liquid crystal display device according to the item (4), the light guide plate has an end portion thicker toward a direction of the end surface facing the light source, and at least a part of the end portion is the protrusion portion.

(6) In the liquid crystal display device according to the item (4) or (5), the end portion of the end surface side of the protrusion portion has a concave portion, and the light source is accommodated in the concave portion.

(7) In the liquid crystal display device according to any one of the items (1) to (6), the backlight includes a frame that accommodates the light source and the light guide plate inside, and the frame is stuck onto the liquid crystal display panel with the avoidance of an end portion of the liquid crystal display panel, which is adjacent to the light source.

DETAILED DESCRIPTION OF THE INVENTION

Hereinafter, an embodiment of the present invention will be described with reference to the accompanying drawings.

Figure 1:
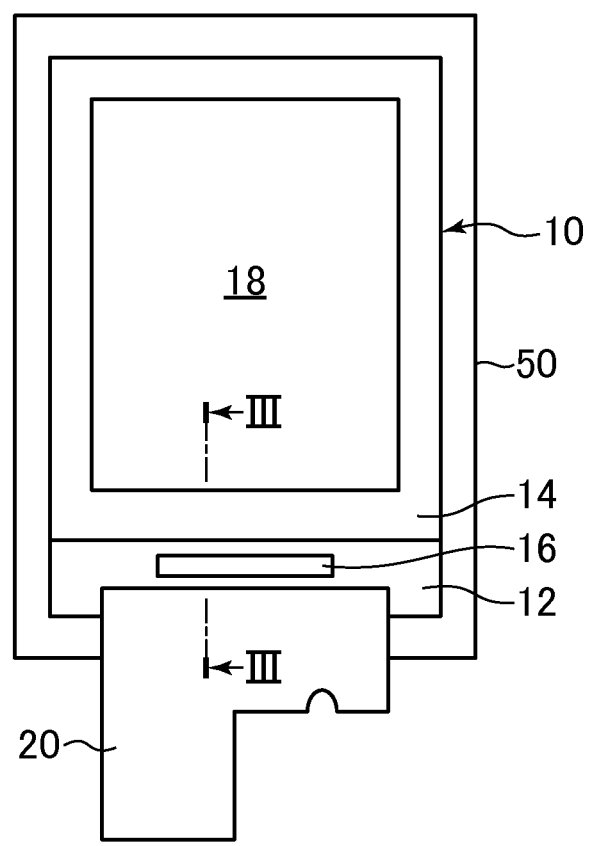
FIG. 1 is a diagram illustrating a front surface of a liquid crystal display device according to an embodiment of the present invention.
Figure 2:
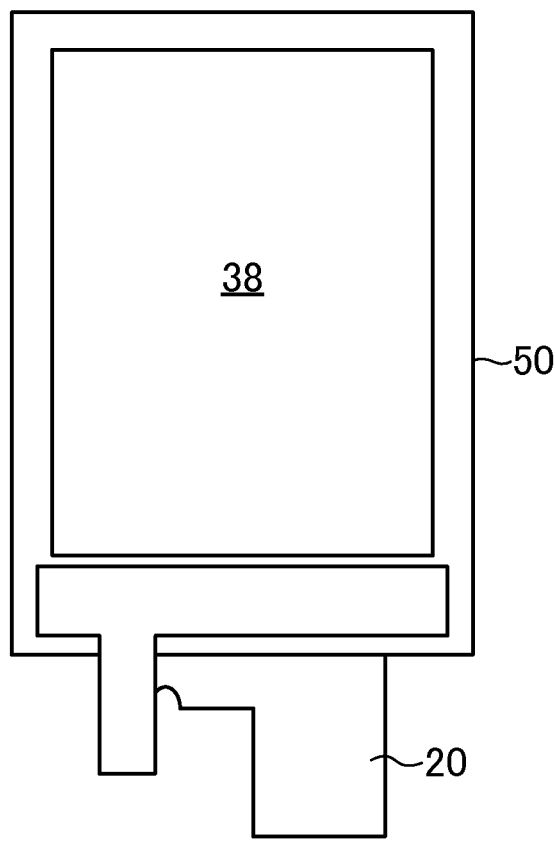
FIG. 2 is a diagram illustrating a rear surface of the liquid crystal display device according to the embodiment of the present invention.
Figure 3:
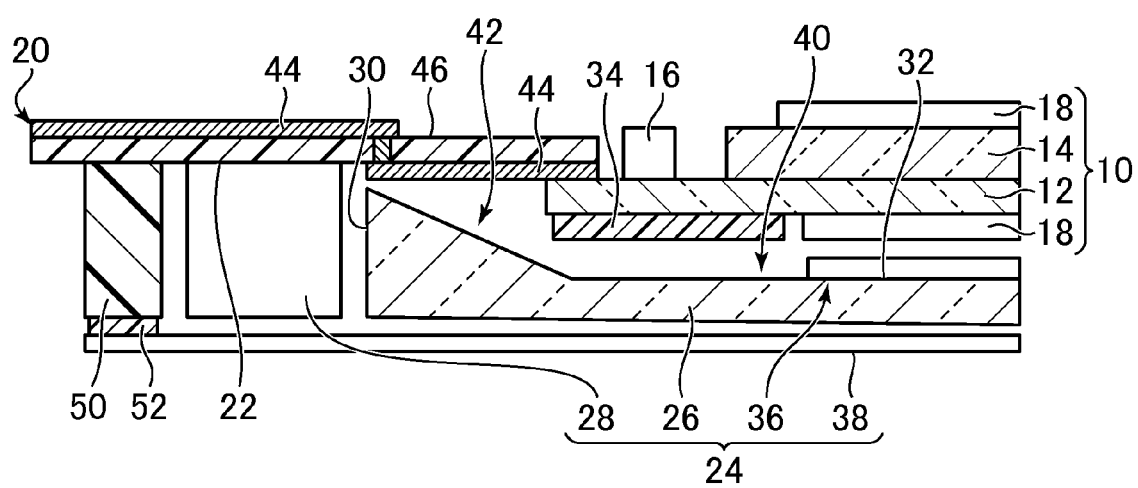
FIG. 3 is a cross-sectional view taken along a line III-III of the liquid crystal display device shown in FIG. 1.

FIG. 1 is a diagram illustrating a front surface of a liquid crystal display device according to an embodiment of the present invention. FIG. 2 is a diagram illustrating a rear surface of the liquid crystal display device according to the embodiment of the present invention. FIG. 3 is a cross-sectional view taken along a line III-III of the liquid crystal display device shown in FIG. 1.

The liquid crystal display device includes a liquid crystal display panel 10. The liquid crystal display panel 10 includes a pair of substrates 12 and 14 (both are, for example, a glass substrate), and liquid crystal not shown is interposed between those substrates 12 and 14. One substrate 12 is formed of a TFT (thin film transistor) substrate (or array substrate) including thin film transistor, pixel electrodes and lines, and the other substrate 14 is formed of a color filter substrate. On the liquid crystal display panel 10 is mounted an integrated circuit chip 16 incorporating a driver circuit for driving the liquid crystal. A polarizing plate 18 is stuck on each of the pair of substrates 12 and 14 of the liquid crystal display panel 10. One substrate 12 of the liquid crystal display panel 10 is connected with a flexible wiring substrate 20. The flexible wiring substrate 20 is connected to one substrate 12 on a first surface 22 (refer to FIG. 3) thereof.

As illustrated in FIG. 3, the liquid crystal display device has a backlight 24 of an edge light system. The backlight 24 has a light guide plate 26 and a light source 28. The light source 28 faces an end surface 30 of the light guide plate 26. The light guide plate 26 has a light emitting surface 32 that emits a light input from the light source 28 into a planar shape. The light guide plate 26 is placed on the liquid crystal display panel 10. A front surface (light emitting surface 32) of the light guide plate 26 faces a rear surface of the liquid crystal display panel 10. A light blocking sheet 34 (for example, double-stick tape) is stuck onto an end of the rear surface of the liquid crystal display panel 10. With this configuration, the light is prevented from being input from the light guide plate 26 to an outside area of an area of the liquid crystal display panel 10 where an image is displayed.

An optical sheet group 36 is arranged between the liquid crystal display panel 10 and the light guide plate 26. The optical sheet group 36 includes a diffusion sheet and a prism sheet. Also, a reflection sheet 38 is arranged under the light guide plate 26 (opposite side to the optical sheet group 36).

The light guide plate 26 includes a facing portion 40 that faces the liquid crystal display panel 10. The light guide plate 26 includes a protrusion portion 42 protruded from a position facing the liquid crystal display panel 10. The end surface 30 facing the light source 28 of the light guide plate 26 is formed in the protrusion portion 42. The protrusion portion 42 is thicker toward a direction of the end surface 30 facing the light source 28. The thickest portion of the protrusion portion 42 forms the end surface 30 facing the light source 28. A surface of the protrusion portion 42 which faces the liquid crystal display panel 10 is located at a higher position than the rear surface of the liquid crystal display panel 10.

The light source 28 is formed of, for example, a light emitting diode. The light source 28 is arranged on a side of the liquid crystal display panel 10. The light source 28 is arranged so as not to overlap with the liquid crystal display panel 10. The light source 28 is located to face the end surface 30 of the light guide plate 26. The light source 28 is mounted on the first surface 22 of the flexible wiring substrate 20. The light source 28 is located on a side of the end surface of the one substrate 12 connected with the flexible wiring substrate 20. According to this embodiment, since the light source 28 and the liquid crystal display panel 10 do not overlap with each other, the liquid crystal display device can be thinned.

The flexible wiring substrate 20 has a signal line 44 electrically connected to the liquid crystal display panel 10. The signal line 44 passes on the first surface 22 in an area extending from the liquid crystal display panel 10 to a near side of the light source 28 (position closer to the liquid crystal display panel 10 than the light source 28). The signal line 44 passes on a second surface 46 opposite to the first surface 22 in a mounting area of the light source 28. The signal line 44 passes on the second surface 46 in an area farther from the liquid crystal display panel 10 than the mounting area of the light source 28.

Figure 4:
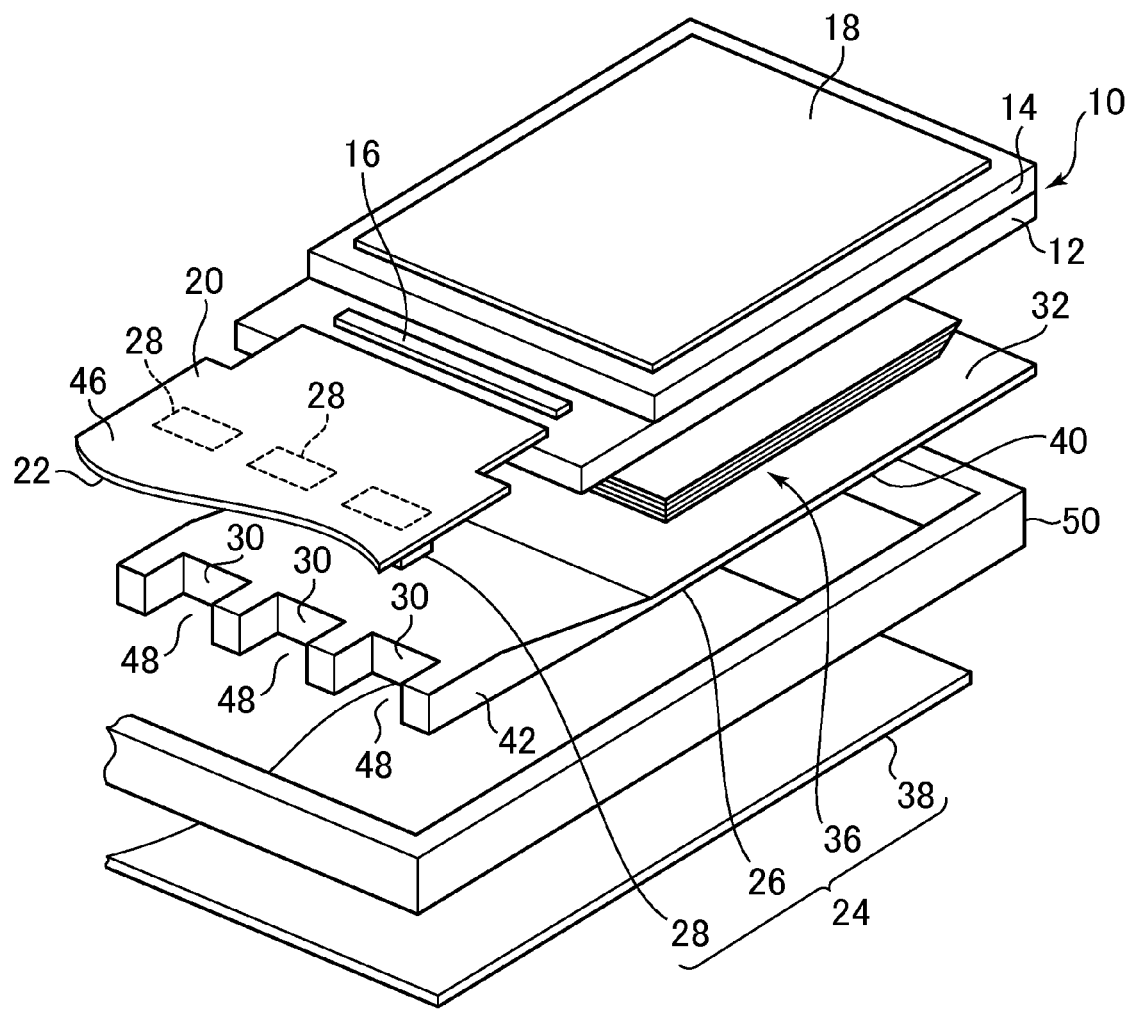
FIG. 4 is an exploded perspective view of the liquid crystal display device according to the embodiment of the present invention.

FIG. 4 is an exploded perspective view of the liquid crystal display device according to the embodiment of the present invention. An end portion of the end surface 30 side of the protrusion portion 42 of the light guide plate 26 has concave portions 48. The concave portions 48 are recessed toward a direction of the facing portion 40 facing the liquid crystal display panel 10, and their bottom surfaces are the end surface 30. The light sources 28 are accommodated in the concave portions 48. The backlight 24 includes a frame 50 that accommodates the light sources 28 and the light guide plate 26 inside. The reflection sheet 38 is stuck onto the frame 50 through a double-stick tape 52 (refer to FIG. 3). The frame 50 is made of, for example, resin. The frame 50 has a frame-like shape, and the liquid crystal display panel 10 is stuck onto one surface of the frame so as to cover an inside space of the frame. The frame 50 is stuck onto the liquid crystal display panel 10 with the avoidance of an end portion of the liquid crystal display panel 10, which is adjacent to the light sources 28 of the liquid crystal display panel 10.

While there have been described what are at present considered to be certain embodiments of the invention, it will be understood that various modifications may be made thereto, and it is intended that the appended claims cover all such modifications as fall within the true spirit and scope of the invention.

What is claimed is:
1. A liquid crystal display device comprising:
a liquid crystal display panel including an upper substrate and a lower substrate, the lower substrate having a rear surface;
a flexible wiring substrate connected to and extending from the liquid crystal display panel; and
a backlight of an edge light system including:
a light source having an upper surface, the upper surface being located under the flexible wiring substrate to be connected thereto at a higher position than the rear surface of the lower substrate; and
a light guide plate located under the rear surface of the lower substrate so as to have a light emitting surface for emitting a light input from the light source into a planar shape and the highest part of the light guide plate is higher than the rear surface of the lower substrate,
wherein the light source is located to face an end surface of the light guide plate on a side of the liquid crystal display panel so as not to overlap with the liquid crystal display panel, and
wherein the light source has a thickness between the upper surface and a lower surface opposite to the upper surface, the thickness being greater than a distance between the rear surface of the lower substrate and a bottom surface opposite to the light emitting surface of the light guide plate.

2. The liquid crystal display device according to claim 1, wherein the flexible wiring substrate is connected to the lower substrate, and
wherein the light source is located on a side of an end surface of the lower substrate.

3. The liquid crystal display device according to claim 2, wherein the flexible wiring substrate is connected to the lower substrate on a first surface on which the light source is mounted, and has a signal line electrically connected to the liquid crystal display panel, and
wherein the signal line passes on the first surface in an area extending from the liquid crystal display panel to the light source, and passes on a second surface opposite to the first surface in an area where the light source is mounted.

4. The liquid crystal display device according to claim 1, wherein the light guide plate includes a facing portion that faces the liquid crystal display panel, and a protrusion portion that protrudes from a position facing the liquid crystal display panel, and
wherein the end surface facing the light source is formed in the protrusion portion.

5. The liquid crystal display device according to claim 4, wherein the light guide plate has an end portion thicker toward a direction of the end surface facing the light source, and
wherein at least a part of the end portion is the protrusion portion.

6. The liquid crystal display device according to claim 4, wherein the end portion of the end surface side of the protrusion portion has a concave portion, and
wherein the light source is accommodated in the concave portion.

7. The liquid crystal display device according to claim 1,
wherein the backlight includes a frame that accommodates the light source and the light guide plate inside, and
wherein the frame is stuck onto the liquid crystal display panel with the avoidance of an end portion of the liquid crystal display panel, which is adjacent to the light source.

\* \* \* \* \*